A. H. POLLEN AND H. F. LANDSTAD.
BOMB DROPPING SIGHT FOR AIRCRAFT.
APPLICATION FILED APR. 3, 1919.
1,314,428.
Patented Aug. 26, 1919.
11 SHEETS—SHEET 7.
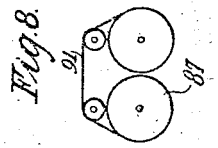
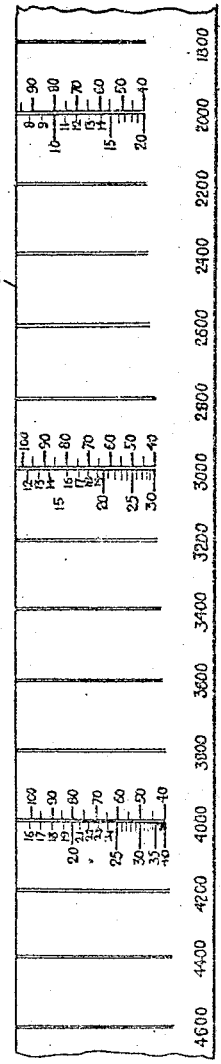
Inventors
Arthur H. Pollen
Halvor F. Landstad
By
Rogers, Kennedy & Campbell
Attys

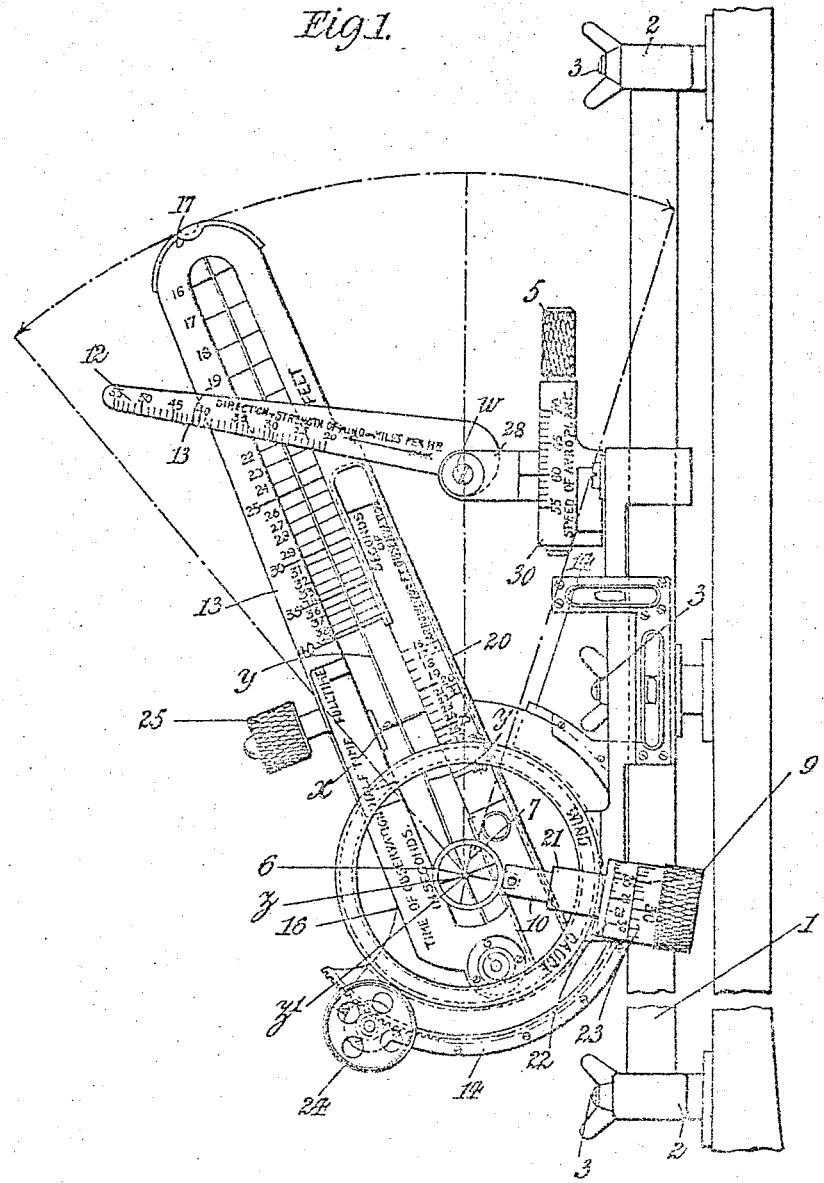
A. H. POLLEN AND H. F. LANDSTAD.
BOMB DROPPING SIGHT FOR AIRCRAFT.
APPLICATION FILED APR. 3, 1919.
1,314,428. Patented Aug. 26, 1919.

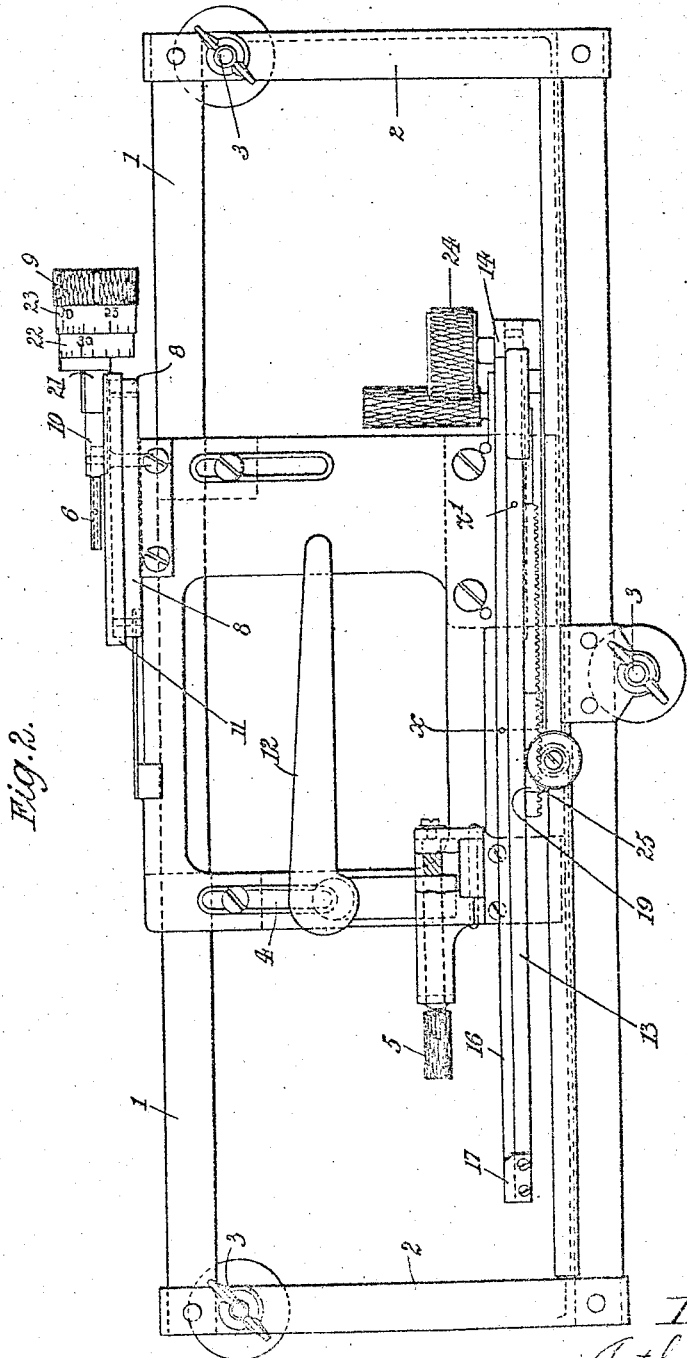

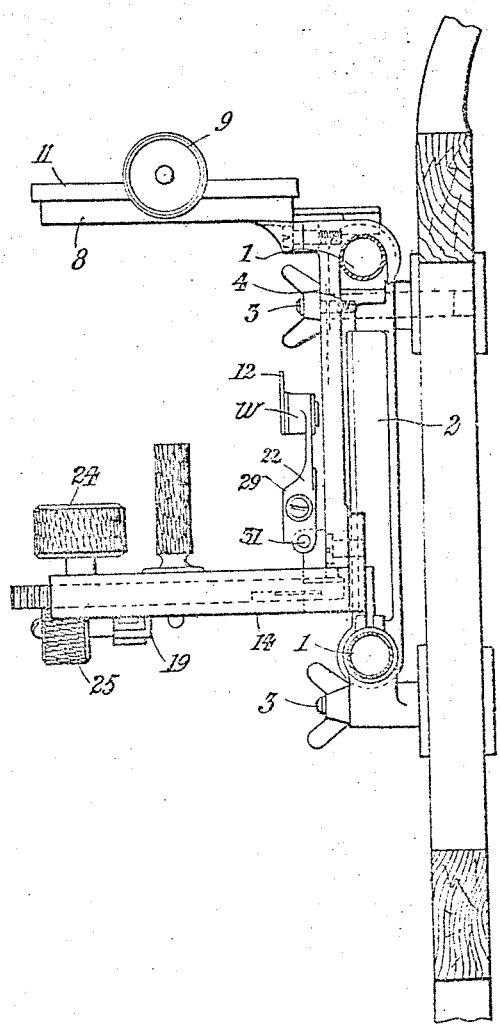

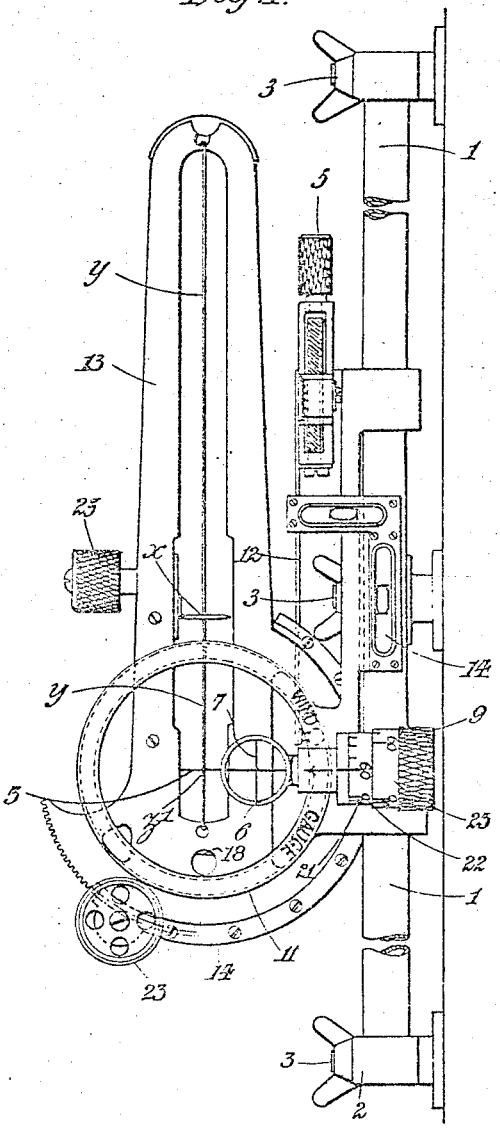

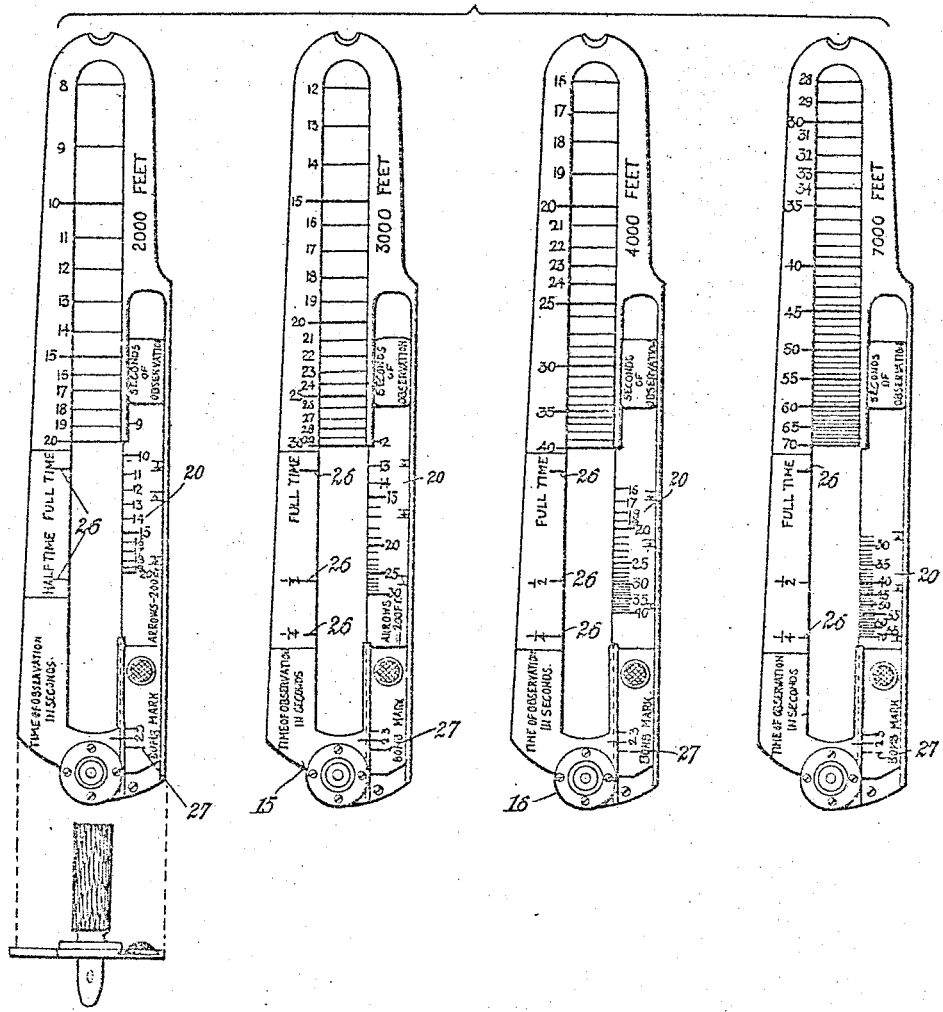

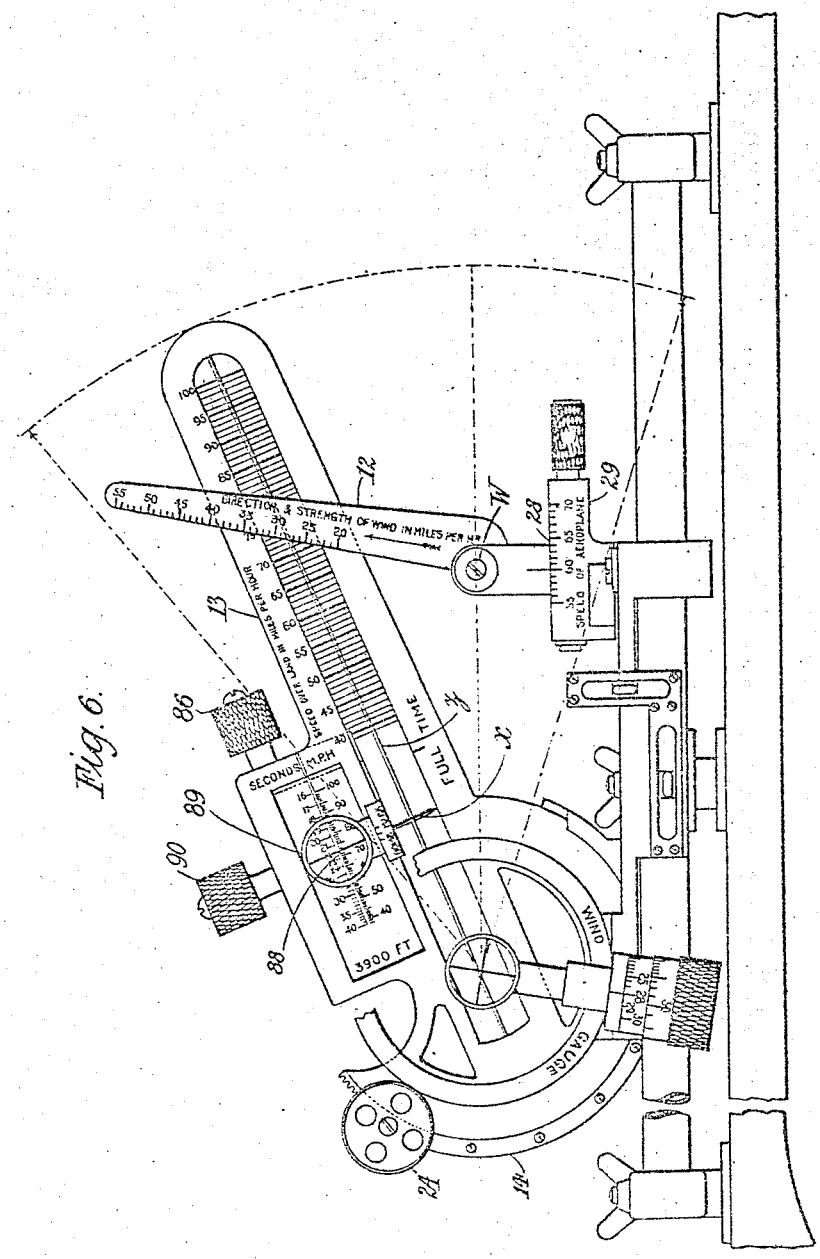

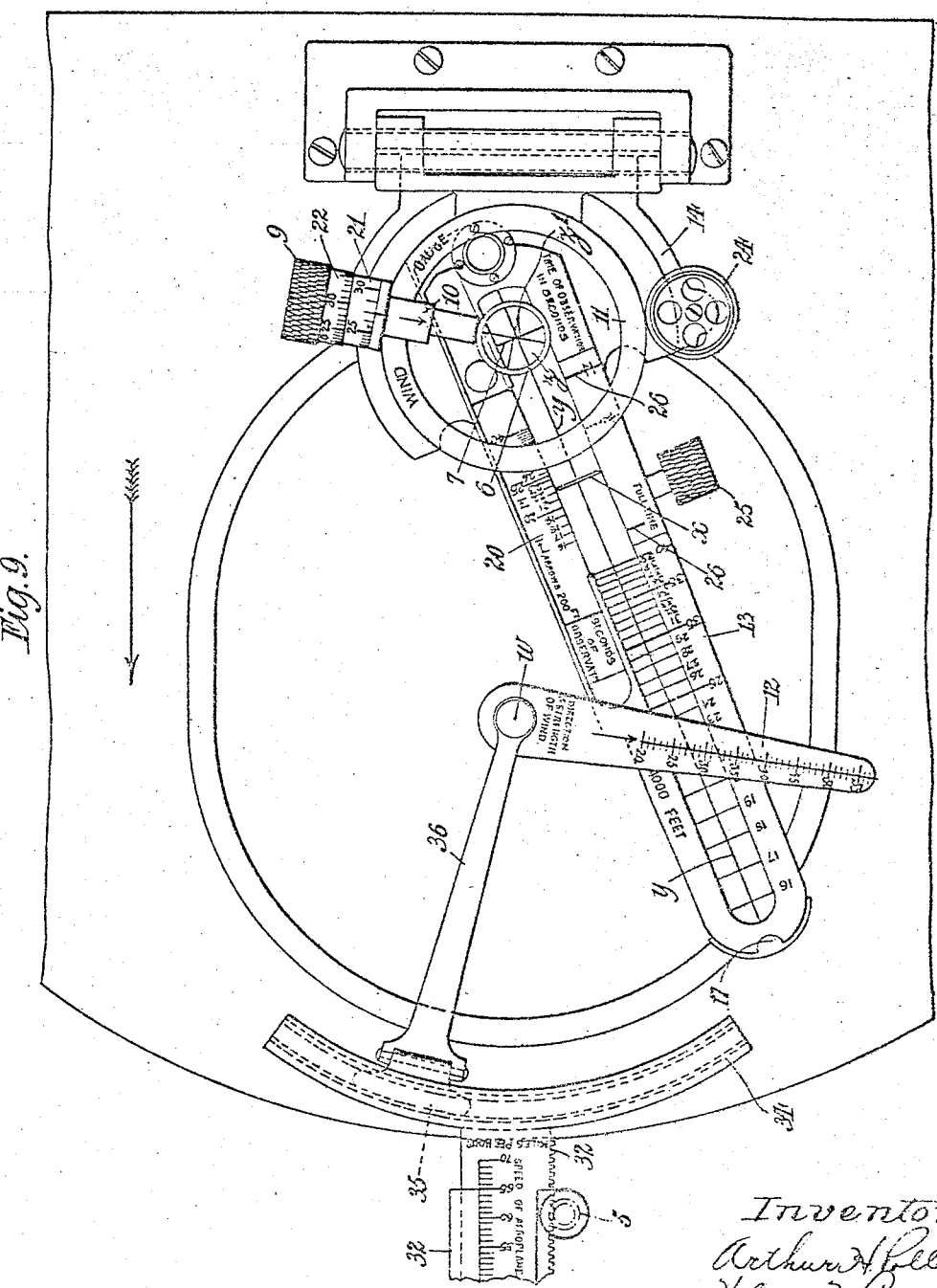

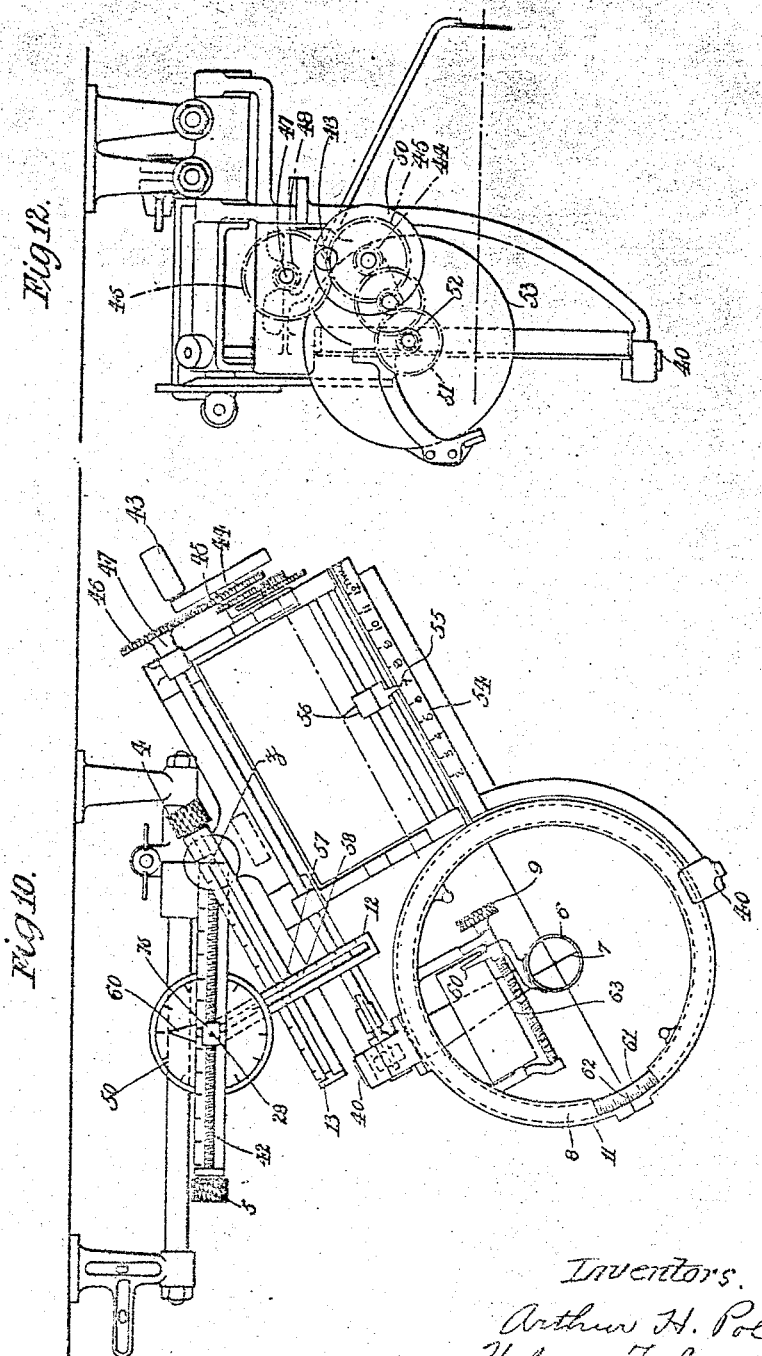

A. H. POLLEN AND H. F. LANDSTAD.
BOMB DROPPING SIGHT FOR AIRCRAFT.
APPLICATION FILED APR. 3, 1919.

1,314,428.

Patented Aug. 26, 1919.
11 SHEETS—SHEET 11.

Inventors
Arthur H. Pollen
Halvor F. Landstad
By Rogers, Kennedy & Campbell
Att'ys

UNITED STATES PATENT OFFICE.

ARTHUR H. POLLEN, OF LONDON, AND HALVOR F. LANDSTAD, OF YORK, ENGLAND.

BOMB-DROPPING SIGHT FOR AIRCRAFT.

1,314,428.  Specification of Letters Patent.  Patented Aug. 26, 1919.

Application filed April 3, 1918. Serial No. 287,329.

*To all whom it may concern:*

Be it known that we, ARTHUR HUNGERFORD POLLEN, a subject of the King of Great Britain, residing at 14 Buckingham street, Strand, London, W. C., and HALVOR FOLKSTAD LANDSTAD, a subject of the King of Great Britain, residing at Bishophill House, York, Yorkshire, have invented certain new and useful Improvements in Bomb-Dropping Sights for Aircraft, of which the following is a specification.

This invention relates to a sight for dropping bombs from aircraft, and depends for its action on the mechanical reproduction of a triangle of velocities. One vector of this triangle arranged parallel to the fore and aft line of the aircraft represents in magnitude and direction speed through the air. The second vector which normally makes a small angle with the first vector represents in magnitude and direction speed overland, and the third vector represents in magnitude and direction the speed of the wind.

We proceed to describe the invention with reference to the accompanying drawings in which—

Figure 1 shows a plan view of one form of the sighting device.

Fig. 2 shows an elevation of the same from the side.

Fig. 3 shows an elevation of the same from behind.

Fig. 4 shows the speed overland vector arm without any scale inserted.

Fig. 5 shows four scales for use at different heights.

Fig. 6 shows a plan view of another form of sighting device.

Fig. 7 shows a plan view of the strip on which the scales are marked.

Fig. 8 is a side elevation of the rollers on which the scale strip is mounted.

Fig. 9 shows another modification of the sighting device.

Fig. 10 is a plan of still another modification of the sighting device.

Fig. 12 is an end elevation of the same.

Figure 11:
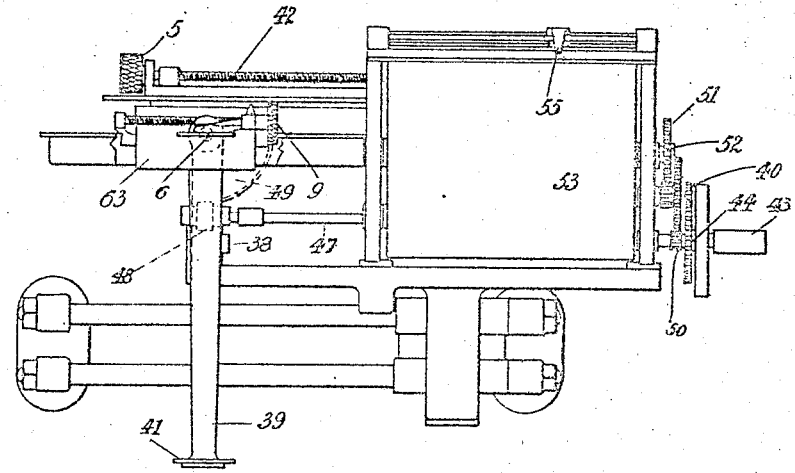
Fig. 11 is a side elevation of the same.

In one form of our invention the sight is mounted on a rectangular frame, which is formed from the horizontal bars 1, 1 see Figs. 1, 2 and 3 and the end pieces 2, 2. This frame is leveled up and fixed to the aeroplane body with bolts 3 so that it rests on three bosses at the side of the aeroplane body. The sighting device which can be hooked on the upper bar 1 and is guided by the lower bar, and can be horizontally set along these bars in order to suit the pilot's convenience. Clamps 4, 4 hold the sighting device in position on the bars with sufficient friction, therefore no locking device is needed.

The first vector or speed through the air vector (which can be read on an anemometer) is set up parallel to the fore and aft line of the aircraft by moving a block 28 in a horizontal guide 29 toward or away from the intersection $z^1$ of a fixed pair of crosswires $y$ and $z$ carried by a swinging sighting arm 13 to be more particularly described hereinafter.

These crosswires, the point of intersection $z^1$ of which crosswires constitutes a pointer, are arranged vertically beneath the normal position of an eyepiece 6 with said pointer in vertical coincidence with the eyepiece, and the latter is conveniently fixed so that the airman can lean over to the side and look vertically down through it at the ground. The block 28 carries a fulcrum $w$ on which pivots the third vector of the triangle namely the arm 12 representing speed and direction of wind. In Fig. 1, the arm 12 is shown in its working position but in Figs. 2 and 3 the arm 12, block 28 and the guide 29 are shown folded up into a vertical position about the hinge 31 by which the aforesaid parts are attached to the main body of the sighting device. This arrangement reduces the danger of the arm 12 becoming damaged when not in use. The scale 30 of speed through the air is conveniently arranged at 10 miles per hour to the inch, so that if the speed through air is 60 miles per hour, the distance from $z^1$ to the fulcrum $w$ of the third or wind speed vector of the triangle will be 6 inches. The setting for any given speed through the air is easily accomplished by a knurled head 5 on a screw which moves the block 28 in the horizontal guide 29.

The second or "speed overland vector" is represented by the main swinging arm 13 which is mounted at its inner end to swing around an axis coincident with the point of intersection $z^1$ of the crosswires $y$ and $z$, before alluded to, a sufficient amount to either side of the fore and aft line of the aircraft. The arm is provided with a central track wire constituted by the wire $y$ before alluded to, which wire is fixed at its opposite ends to the ends of a longitudinal slot in the arm. This arm is mounted in a carrier frame 14 which allows a sufficient amount of friction to hold the arm in position after it is set, so that no locking device will be required. The setting of this arm is done by rack and pinion by means of knob 24.

The arm is merely a holder for various scales which are supplied with the sighting device in order that it may be utilized for different heights, say for each 500 or each 1000 feet.

The arm without any scale is shown in Fig. 4 and four scales for different heights of flight are shown in Fig. 5.

It will be noticed that the graduations on the second vector representing "speed overland" are not in miles per hour but in seconds of time. The reason for this will be apparent later.

We now proceed to describe the method of obtaining the vector speed overland. In the first place, it is easy to so set the arm 13 that objects viewed through the eyepiece 6 appear to follow down the track wire $y$.

When this is done, the direction of the arm corresponds with the direction of flight overland. To obtain the magnitude of this vector, the height at which the aircraft is flying is first noted and a corresponding scale is chosen. The scale slips into a pocket 17 at one end and a catch 18 holds it in place at the other end. This scale can easily be replaced by another scale—a one-hand motion.

The pilot watches an object through the eyepiece 6 and swings the horizontal arm 13 in line with the track of the aeroplane by knob 24, that is he swings the arm 13 so that the object he is watching through the eyepiece 6, will pass along the track line $y$, and at the same time aiming the flight so that the continuation of the track line $y$ must be pointing in the direction of the object to be bombed. The horizontal arm 13 is then ready set in line with the "course overland" of the aeroplane, and the observation of "speed overland" can now take place.

A slider 19 is mounted in guides fixed underneath the horizontal arm 13 which can be set by rack and pinion by knob 25. To this slider is fixed a wire $x$ which, at its right hand end, serves as a setting pointer with the scale 20, and at its left hand end serves as a pointer with the division lines 26, 26, marked full time $\frac{1}{2}$, $\frac{1}{4}$.

This slider is now set outward along the horizontal arm 13 by the knob 25 so that the pointer $x$ at its left hand end is in line with the division line 26 marked "full time." In this position the line joining the crosswires 7 in the eyepiece 6 and the wire $x$ forms an angle 30° with the vertical line through the eyepiece and the intersection $z^1$ of the wires $y$ and $z$. The eyepiece is placed in its normal position and an object is observed passing along the track line $y$. At the moment the object arrives at the position $x$, the pilot starts a stop-watch conveniently provided with a flexible trigger motion; (the watch being most conveniently fixed in a holder on the dash-board). He follows the object until it is vertically below the eyepiece, that is at $z^1$, and stops the watch with a second pull on the trigger. It will be observed on inspecting the scales shown in Fig. 1 and Fig. 5 that the scales carry on their left hand sides graduations in seconds. Thus the scale for 4000 feet is graduated from 16 to 40 seconds. These graduations are calculated to give the speed overland (at the scale of 10 miles per hour per inch) for the time of flight over a distance on the ground subtending 30° at the height of flight. Consequently if the time indicated by the stop-watch were 22 seconds and the height 4000 feet, the terminal of the speed overland vector will coincide with the graduation 22 on the 4000 feet scale. All that is necessary to complete the triangle of vector velocities is to rotate the wind vector arm 12 around the pivot $w$ until its edge intersects the track line $y$ at the graduation 22. This is the position shown in the drawing.

For the $\frac{1}{2}$ and $\frac{1}{4}$ time positions if these are used instead of the full time position the time observed must be multiplied by two or four.

When the arm 12 has been set as described it will represent the direction of the wind and also its speed and the arm 12 is therefore graduated to the same scale of 10 miles per hour per inch and the value of the wind velocity is read directly against the track wire $y$.

We now have all the data for setting the sight. It will be noticed that each scale has a graduation on its right hand side also in seconds. These are determined so that with a speed overland represented as above of 22 seconds say, the crosswire $x$ must be placed in coincidence with the right hand graduation 22 so as to act as a correct foresight for dropping the bomb. In making the calculations for these graduations, the various factors of height, speed overland and resistance of the air for the particular bomb chosen are taken into account. If another type of bomb is used, the scale is shifted slightly on its supporting arm as shown by the graduations 27 on the scales at the right hand lower corner. A similar correction is applied to the eyepiece by knob 9 with graduations 22 or 23 according to the particular type of bomb employed.

Both these corrections are made before leaving the ground.

It now remains to explain how the correction for the effect of the wind on the bomb is made.

The eyepiece 6 with crosslines 7 is mounted at the top of the instrument in such a manner that the eyepiece can be set eccentric with regard to the frame ring 8 by a knob 9 by means of a screw action.

The amount of eccentricity may be read off on the graduations 22 and 23 on knob 9.

The ring 11 in which the eyepiece stem is mounted rides on the frame ring 8 and can slide around same. These two movements allow the eyepiece to be set eccentric with regard to the frame ring 8 in any direction. Accordingly the eyepiece is rotated in its holder until the arm 21 is parallel to the wind arm 12 and the reading of strength of wind on arm 12 is then applied to knob 9. The sight is now set and if the bomb is released when the objective as observed through the eyepiece intersects the crosswire $x$, a hit should result.

It will be noticed that in the constructions shown in Figs. 1 to 5 the speed overland vector is more adaptable for being operated outward, that is, to the left. It may therefore be useful to carry a sight on each side of the aircraft, one for use when the wind is from the right and the other when the wind is from the left.

In Fig. 9 a modified construction of the sighting device is shown which obviates the necessity for carrying a sighting device on each side of the aircraft. The main difference between this construction and that first described resides in the support of the fulcrum $w$. It will be seen from Fig. 9 that in this form of the device the speed through the air is set up on a sliding bar 32 sliding in a guide 33 operated by the knurled head 5.

The sliding bar 32 carries a circular track 34 in which slides a slider 35 carrying the radial arm 36 at whose extremity $w$ (which always coincides with the center of the circular track 34) is pivoted the wind vector arm 37. A large opening is provided through which the objects on the ground can be viewed and it will be seen that in this construction the speed overland vector 13 and the wind vector 12 can be set to either side of the fore and aft line $w$, $z$.

Should the aviator after releasing his bomb desire to return on a different course in order to fire another bomb it is not necessary to again take observations for speed overland, although the speed overland will on the second occasion differ from that on the first occasion, because he can reset his sight equally well from the speed of wind which may be assumed unchanged. He therefore proceeds as follows:—Arm 13 is set so that the track wire $y$ coincides with the new direction of flight overland and arm 12 is made to intersect the track wire $y$ at the same point on the arm 12 as before. This will cause the arm 12 to intersect the track wire at some graduation on the scale, and if the foresight $x$ is set to the same graduation on scale 20 the foresight will be correctly set for the new course. The arm 21 is then set parallel to the new position of arm 12 and the sight is now ready for releasing another bomb as soon as the objective comes into line of vision on the new course.

We may, if desired, introduce a modification in this system in which the speed overland which as before was obtained in miles per hour is set up by means of the wind vector in the scale inserted in arm 13 in miles per hour in Fig. 6.

With the arrangement it is not necessary to change the scales inserted in arm 13 for various heights but on the other hand the bomb dropping scale 20 in Fig. 1 must be changed for varying heights.

We accordingly provide a series of scales shown in Fig. 7 for various heights printed transversely on a long strip of paper, any one of which can be brought into operative position by handle 86 which rotates roller 87 on which the strip is mounted. These scales are graduated both in time and in height and an index 88 in circle 89 serves to set the time as indicated by the stop watch and at the same time serves to indicate the speed in miles per hour overland when the proper altitude scale is turned into its operative position by handle 86.

The index 88 is moved by the handle 90 by rack and pinion motion and carries the foresight $x$ with it. The foresight so set will be in the right position for dropping the bomb. The speed in miles per hour obtained from the scale at once gives the position at which the wind vector must be set to intersect the miles per hour scale inserted in arm 13, and thus indicate the direction of the wind.

The advantages of this construction are that you set up time of flight over the angle of 30° on the ground and obtain speed in miles per hour directly and if the altitude is not changed the foresight is correctly set.

If however, the altitude is changed; it being assumed that the speed overland remains constant, all that is necessary is to wind the strip 91 so as to present a scale corresponding to the new altitude and if the index line is set to the speed overland on this new scale this will be the new position for the foresight.

We now proceed to describe another modification of the above sighting mechanism which is designed so that the graduations for "speed overland" for all heights are set out on one scale drum; therefore if the pilot wishes to change his altitude suddenly, his "speed overland" for the new altitude can be easily re-set by means hereinafter described. The principle of the sight remains the same, the vector triangle formed by the three vectors "speed through air" "speed overland" and "speed of wind" is unchanged but the method of obtaining speed overland is changed in that instead of timing the flight of the aircraft over a distance subtending 30° at the aircraft, the flight is timed over a definite distance on the ground say ⅓rd of a mile.

Referring to Figs. 10, 11 and 12 as before the speed through the air is set up by shifting the block 28 parallel to the fore and aft line of the aircraft by means of the knob 5 mounted on the screw 42 which engages with a nut fast on the block 28. The block 28 as before carries a fulcrum 75 around which the wind vector arm 12 can rotate in a horizontal plane so that it lies over and intersects the speed overland vector arm 13 pivoted at z, which point is as before, the origin of the speed through the air and speed overland vectors. In order to adapt the sight to the modified method of determining speed overland it has been separated from the vector triangle but the arm 13 and the whole of the rest of the sight pivot around the axis $z^1$. As before there is an eyepiece 6 provided with crosswires 7 carried on a ring 8 capable of being rotated around the ring 8 and of being set eccentric to the ring by the knob 9 by means of a screw action. The ring 8 can swing about centers 40, 40, so that the axis of swing is horizontal and perpendicular to the speed overland vector 13. The ring carries a depending arm 39 which arm carries at its lower end the fore sight in the form of a loop 41 with crosswires. As the ring 8 and arm 39 are swung about the axis 40, 40 the line of sight will follow the course overland of the aircraft. A back stop 38 is provided which determines the position when the line of sight is vertical.

Figure 13:
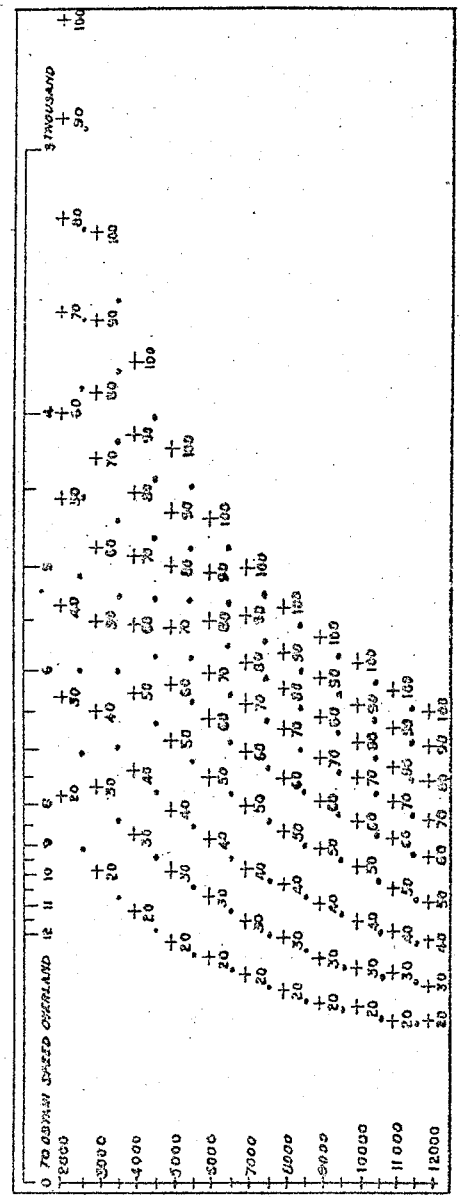
Fig. 13 is a development of the drum for setting "speed overland."
Figure 14:
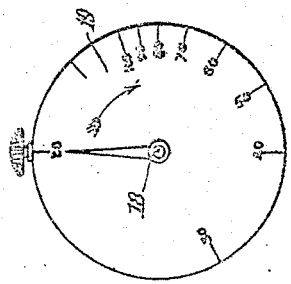
Fig. 14 is a plan view of a speed recorder.

It will be easily seen that at any given height of flight there is a particular angle which will be subtended at the aircraft by ⅓rd of a mile of ground, and the method of determining speed overland is to set the arm 39 forward of the vertical by this angle and to observe the time interval between the instants at which an object on the ground crosses the line of sight in this position and again crosses the line of sight when the latter is vertical, the arm being moved back to the stop 38 in the interval. In order to be able to set the arm conveniently to this forward angle, the arm is driven from a handle 43 on shaft 44 carrying gear wheel 45 meshing with gear wheel 46 on shaft 47 carrying worm 48 engaging with sector 49 fixed to the ring 8 and in order that the angle may be at once determined through which the arm must be moved for a given height in order to ascertain speed overland, the handle shaft 44 also carries a gear wheel 50 meshing with gear wheel 51 on shaft 52 carrying a drum 53. The drum is graduated around one end (as shown developed in Fig. 13) in heights above the ground and when the handle 43 is rotated to bring the desired height graduation against a pointer, the arm will be set to subtend a distance of ⅓rd of a mile on the ground at that height between the forward and backward position of the line of sight. Thus in order to obtain the speed overland an object is viewed through a line formed by the crosswires in the front and rear sighting loops, and at that instant the speed recorder, or stopwatch (see Fig. 14) is set going, and the arm 39 is gradually moved into the vertical position, the object aimed at being kept within the area of the sighting loops and when the object viewed passes the crosswires the speed recorder is stopped and the pointer 18 will indicate a figure on the card 19. If the minimum speed of 20 miles per hour is assumed and the watch makes one revolution while arm swings from one position to the other, that is a distance of ⅓rd of a mile on the ground then the pointer $19^a$ must make one revolution in one minute which equals a speed of 20 miles per hour; a half revolution of pointer will be equivalent to 40 miles per hour, a quarter revolution equals 80 miles per hour and so on; therefore the pointer 18 will directly indicate the speed overland of the aircraft.

The speed overland, could, if desired be read off in seconds of time; the graduations on the drum 53 would then be graduated in seconds of time, and the figure which is now 20 would become 60, 40 would become 30, 80 would become 15 and so on.

Having thus obtained the speed overland the foresight is set to the required angle by rotating the handle 43 until the speed overland is indicated against the pointer 56 the pointer having already been set to the height by means of the pointer 55 against the height as shown on graduated scale 54. It will be seen that the graduations on the drum are really curves representing the positions of the drum for a given overland speed at various heights, one coördinate being angular position of drum and the other height.

The magnitude and direction of the wind vector is obtained from the same linkage as before by setting up "speed through air" by knob 5 thus positioning fulcrum 75, by setting up "speed overland" by knob 4 by means of a screw which moves a nut 57 along the speed overland arm which nut engages a slot in the wind vector arm which is pivoted at 75. In this way the magnitude of the wind vector can be read off on the scale 58 and the angle on the graduated disk 59 carried by the block 28 against the pointer 60.

Having thus obtained the magnitude and direction of the wind, the ring 8 is rotated in the ring 11 to set up direction of wind on scale 61 against pointer 62 and the backsight is set by rotating the drum 63 to the height of the aircraft and moving the pointer 60 to the observed speed of wind. The backsight and foresight are now both set and if the bomb is released when the objective comes into line of sight a hit should result.

The curves of graduations on the drums 53 and 63 are calculated to give the necessary direction of the line of sight to obtain a hit taking into account the resistance of the air to the normal bomb. Another type of bomb merely requires a fresh pair of drums to be fitted.

With both types of bomb sight a pair of cross levels are fitted to the aircraft to enable it to be flown on an even keel.

It will be easily seen that when flying over sea it is difficult to obtain a fixed object on which to sight.

The observer drops a bomb or its equivalent which produces a visible effect on hitting the water such as a light or a column of smoke. This bomb will hit the water a certain amount astern of the aircraft at the moment of impact in a certain direction depending on the height of flight, the speed of the wind and the course over water.

In order to obtain speed over water by this method the observer must fly either with or against the wind so as to have no drift and at a known speed say 60 miles per hour.

Under these conditions at a given height and speed the aircraft will be at the moment of impact ahead of the place of impact by a definite angle $\alpha$.

As all observations have to be made astern instead of ahead, a foresight position 30° astern of the vertical through the plane is fitted in the arm 13.

The procedure for obtaining speed over water is as follows:—The observer drops bombs until he can fly in a course without drift he then drops a sighting bomb and starts the stop watch at the moment the bomb hits the water. When the bomb passes the rear foresight he stops the watch.

This stop watch time added to the known constant time for the angle $\alpha$ gives the observation time for the angle observed.

The compass direction of the driftless course is noted in order to determine the direction of the wind.

As on the driftless course the wind vector is co-linear with the vector representing the speed of the aircraft through the air, the speed of the wind can be obtained by subtracting the speed through the air from the speed over sea determined from the observation of the bomb.

We have now determined the direction and speed of the wind and the aviator can confidently put his machine in the desired course and by setting his wind vector to the direction of the wind and arranging that the speed over land vector shall cut the wind vector at the point indicating the known speed of the wind, the aviator can determine speed overland or sea on his new course.

The method of determining when to release the bomb is as before.

What we claim is:—

1. In a sighting device for aircrafts, the combination of a supporting frame, a sighting arm pivoted to said frame and having graduations for use at a certain height to indicate different speeds overland, a slide movable to and from the axis of the arm to indicate the speed through the air, and a second arm pivoted to the slide and adapted to be set at the graduation on the sighting arm representing the particular overland speed, said second arm being provided with graduations adapted to be read in connection with those on the sighting arm and representing the speed of the wind.

2. In a sighting device for aircrafts, the combination of a supporting frame, a sighting arm pivoted to said frame and having a track line along which the pilot may sight an object below, said sighting arm adapted to be set to represent the speed overland vector, a slide movable to and from the axis of the sighting arm and adapted to be set to represent the speed through the air vector, and an arm pivoted to said slide and adapted to be set with reference to said first mentioned arm to represent the speed and direction of wind vector.

3. In a sighting device for aircrafts, the combination of a supporting frame, a sighting arm pivoted to said frame and having a track line along which the pilot may sight an object below, said sighting arm having graduations calculated with reference to the speed through the air, and the strength of the wind at a given height, to represent the speed overland, a second arm having graduations adapted to be read in connection with the graduations on the sighting arm, and calculated with reference to the speed through the air and speed overland, to represent the strength of the wind, and a slide carrying said second arm and adapted to be set to indicate the speed through the air.

4. In a sighting device for aircrafts, the combination of a supporting frame, a sighting arm pivoted to said frame and having a track line along which the pilot may sight an object below, said sighting arm having graduations to represent speed overland, a slide movable to and from the axis of the sighting arm to indicate the speed through the air, and a second arm pivoted to said slide and adapted to be set to intersect the sighting arm and being provided with graduations representing the speed of the wind, the graduations on said arms being so calculated that when the second arm intersects the sighting arm at a graduation thereon indicating the speed overland at a given height, the coincident graduation on the second arm will indicate the speed of the wind, and the position of the arm will indicate the direction of the wind.

5. In a sighting device for aircrafts, the combination of a supporting frame a sighting arm pivoted thereto to swing horizontally and provided with a track line along which the pilot may sight an object below by swinging the arm on its pivot, an eye-piece above said track line, a pointer associated with the track line in vertical coincidence with the eye-piece to enable a sight to be taken in a vertical line, and a second pointer associated with the track line to enable a sight to be taken on a line making a definite angle with the vertical line.

6. In a sighting device for aircrafts, the combination of a frame, a sighting arm pivoted thereto to swing horizontally and having a track line along which the pilot may sight an object below by swinging the arm horizontally, an eye-piece above said track line, a pointer associated with the track line in vertical coincidence with the eye-piece to enable a sight to be taken in a vertical line, and a second pointer associated with the track line to enable a sight to be taken in a line making a definite angle with the vertical, whereby the speed overland may be calculated, said second pointer being movable lengthwise of the track line to serve as a foresight in dropping a bomb.

7. In a sighting device for aircrafts, the combination of a supporting frame, a sighting arm pivoted thereto to swing horizontally and having a track line along which the pilot can sight an object below, an eye-piece above the track line, a pointer associated with the track line in vertical coincidence with the eye-piece to enable a sight to be taken in a vertical line, and a second pointer associated with the track line to enable a sight to be taken in a line bearing a definite angle to the vertical, whereby the speed overland may be determined, said eye-piece being shiftable out of vertical alinement with the first mentioned pointer to make allowances for the effect of the wind on the bomb.

8. In a sighting device for aircrafts, the combination of a supporting frame, a sighting arm pivoted thereto to swing horizontally and having a track along which the pilot may sight an object below, an eye-piece above the track line, a pointer associated with the track line in vertical coincidence with the eye-piece to enable a vertical line of sight to be taken, a second pointer associated with the track line to enable a sight to be taken on a line bearing a definite angle to the vertical, whereby the speed overland may be determined, the sighting arm being provided with one set of graduations indicating different speeds overland for a given height, and being provided with another set of graduations calculated with reference to the first, and said second pointer being movable lengthwise of the track line so that it may be read in connection with the second set of graduations to serve as a foresight in dropping the bomb.

9. In a sighting device for aircrafts, the combination of a supporting frame, a sighting arm pivoted thereto to swing horizontally and provided with a track line along which the pilot may sight an object below, an eye-piece and an associated pointer to enable a sight to be taken on the object to be bombed, and means for adjusting the eye-piece relatively to the pointer to make allowance for the effect of the wind on the bomb.

10. In a sighting device for aircrafts, the combination of a frame, a sighting arm pivoted thereto to swing horizontally and having a track line along which the pilot may sight an object below, an eye-piece and sighting pointers to enable the pilot to make observations to determine the speed overland, means coöperating with the sighting arm to indicate the direction and speed of the wind, and means for adjusting the eye-piece in accordance with such indications to make allowance for the effect of the wind on the bomb.

11. In a sighting device for aircrafts, the combination of a supporting frame, a sighting arm pivoted thereto to swing horizontally and having a track line along which the pilot may sight an object below, said arm being provided with a set of graduations representing different speeds overland for a given height, and being provided also with a second set of graduations calculated with reference to the first, a second arm provided with graduations representing the speed of the wind, a carrier to which said second arm is pivoted on an axis in fore and aft alinement with the axis of the sighting arm, means for moving the carrier to and from the axis of the sighting arm in accordance with the speed through the air, an eye-piece above the track line, a pointer associated with the track line in vertical coincidence with the eye-piece, a second pointer associated with the track line out of vertical coincidence with the eye-piece, whereby the speed overland may be determined, said second pointer being movable lengthwise of the track line and adapted to be read in connection with the second set of graduations on the sighting arm to serve as a foresight in dropping the bomb, and said second arm being adapted to be set with reference to the first set of graduations on the sighting arm, to indicate the speed and direction of the wind, and means for adjusting the eye-piece to allow for the effect of the wind on the bomb.

12. In a sighting device for aircrafts, the combination of a supporting frame, a sighting arm pivoted thereto to swing horizontally and having a track line along which the pilot may sight an object below by swinging the arm horizontally, an eye-piece above the track line, a pointer associated with the track line in vertical coincidence with the eye-piece, and a second pointer associated with the track line to serve as a foresight in taking observations to determine the speed overland, said second pointer being movable to a different position to serve as a foresight in dropping the bomb.

In testimony whereof we have hereunto set our hands in presence of two subscribing witnesses.

ARTHUR H. POLLEN.
HALVOR F. LANDSTAD.

Witnesses:
  NEVILLE E. BROOKES,
  E. C. WALKER.